United States Patent
Degawa et al.

(10) Patent No.: US 10,032,470 B1
(45) Date of Patent: Jul. 24, 2018

(54) MAGNETIC RECORDING HEAD WITH SPIN TORQUE OSCILLATOR, HEAD GIMBAL ASSEMBLY AND MAGNETIC RECORDING APPARATUS

(71) Applicant: TDK Corporation, Tokyo (JP)

(72) Inventors: Naomichi Degawa, Tokyo (JP); Tetsuhito Shinohara, Tokyo (JP); Shinji Hara, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/649,958

(22) Filed: Jul. 14, 2017

(51) Int. Cl.
*G11B 5/31* (2006.01)
*G11B 5/39* (2006.01)
*G11B 5/60* (2006.01)
*G11B 5/23* (2006.01)
*G11B 5/187* (2006.01)

(52) U.S. Cl.
CPC .......... *G11B 5/3912* (2013.01); *G11B 5/1877* (2013.01); *G11B 5/23* (2013.01); *G11B 5/314* (2013.01); *G11B 5/315* (2013.01); *G11B 5/3133* (2013.01); *G11B 5/6082* (2013.01)

(58) Field of Classification Search
CPC ........ G11B 5/3133; G11B 5/314; G11B 5/315
USPC .............................. 360/125.3, 119.02, 119.04
See application file for complete search history.

(56) References Cited

U.S. PATENT DOCUMENTS

| 8,995,088 | B1 * | 3/2015 | Boone | G11B 5/3146 360/125.32 |
|---|---|---|---|---|
| 9,007,722 | B2 * | 4/2015 | Shimizu | G11B 5/35 360/119.04 |
| 9,047,887 | B2 | 6/2015 | Funayama | |
| 9,741,373 | B1 * | 8/2017 | Shinohara | G11B 5/3912 |
| 9,747,932 | B1 * | 8/2017 | Taguchi | G11B 5/1278 |
| 2014/0063658 | A1 * | 3/2014 | Shimizu | G11B 5/35 360/234.5 |
| 2014/0177100 | A1 * | 6/2014 | Sugiyama | G11B 5/3116 360/125.03 |
| 2014/0313616 | A1 * | 10/2014 | Kusukawa | G11B 5/187 360/125.03 |
| 2015/0043106 | A1 | 2/2015 | Yamada et al. | |
| 2016/0035374 | A1 * | 2/2016 | Takagishi | G11B 5/11 360/125.03 |

(Continued)

OTHER PUBLICATIONS

U.S. Appl. No. 15/138,405, filed Apr. 26, 2016, Shinohara et al.

*Primary Examiner* — Jefferson Evans
(74) *Attorney, Agent, or Firm* — Posz Law Group, PLC

(57) ABSTRACT

A magnetic recording head comprises: a main magnetic pole for generating a recording magnetic field applied to a magnetic recording medium from an end surface that is one part of an air bearing surface facing the magnetic recording medium; a trailing shield that is placed by interposing a write gap at a trailing side of the main magnetic pole; and a spin torque oscillator provided in the write gap; wherein, when viewed from the air bearing surface side, the length in the down-track direction between the trailing shield and the cross-track direction end portion of a first end face positioned at the main magnetic pole side of the spin torque oscillator is longer than the length in the down-track direction between the trailing shield and the main magnetic pole at a center position in the cross-track direction of the spin torque oscillator.

9 Claims, 8 Drawing Sheets

(56) References Cited

U.S. PATENT DOCUMENTS

| | | | |
|---|---|---|---|
| 2016/0035375 A1* | 2/2016 | Gao | G11B 5/35 |
| | | | 360/125.3 |
| 2016/0314809 A1* | 10/2016 | Taguchi | G11B 5/314 |
| 2017/0061995 A1* | 3/2017 | Taguchi | G11B 5/235 |
| 2017/0309299 A1* | 10/2017 | Tang | G11B 5/314 |

* cited by examiner

US 10,032,470 B1

MAGNETIC RECORDING HEAD WITH SPIN TORQUE OSCILLATOR, HEAD GIMBAL ASSEMBLY AND MAGNETIC RECORDING APPARATUS

FIELD OF THE INVENTION

The present invention relates to a magnetic recording head, head gimbal assembly and magnetic recording device.

BACKGROUND OF THE INVENTION

In the field of magnetic recording using heads and medium, further improvement in performance of magnetic recording medium and magnetic recording heads has been sought accompanying greater recording density of magnetic disk devices.

The magnetic recording medium is a discontinuous medium in which magnetic grains are gathered, and each magnetic grain has a single domain structure. In such a magnetic recording medium, one recording bit is configured by multiple magnetic grains. Consequently, to increase recording density, the magnetic grains must be made smaller and unevenness in the boundary between neighboring recording bits must be reduced. However, when the magnetic grains are made smaller, the problem arises that the thermal stability of the magnetization of the magnetic grains decreases accompanying the decline in the volume of the magnetic grains.

As a countermeasure to this problem, enlarging the magnetic anisotropic energy Ku of the magnetic grains has been considered, but this increase in Ku causes an increase in the anisotropic magnetic field (coercive force) of the magnetic recording medium. In contrast to this, the upper limit of the recording magnetic field strength from the magnetic recording head is virtually determined by the saturation magnetic flux density of the soft magnetic material that configures the magnetic core in the head. Consequently, when the anisotropic magnetic field of the magnetic recording medium exceeds the tolerance determined from the upper limit of this recording magnetic field strength, recording on the magnetic recording medium becomes impossible.

At present, one proposed method of solving such a problem of thermal stability is to use a magnetic recording medium formed with a magnetic material having a large Ku, to apply supplemental energy to the medium at the time of recording, and to lower the effective recording magnetic strength. A recording method that uses a microwave magnetic field as the supplemental energy source is called Microwave Assisted Magnetic Recording (MAMR), and research and development in practical use of this are in progress.

In microwave assisted magnetic recording, by applying a microwave magnetic field in the in-plane direction of the medium and at a frequency corresponding to an effective magnetic field (Heft) applied to the magnetization of the recording layer of the magnetic recording medium, precession of magnetization in the recording layer is excited, and the magnetic recording head's recording capabilities are assisted.

As one example of a magnetic recording head utilizing the microwave assisted magnetic recording method, as shown in FIG. 12, a magnetic recording head has been proposed that includes a main magnetic pole 6' that generates a recording magnetic field to be applied to the magnetic recording medium, a wrap-around shield having a trailing shield 81' and side shields 82' and 83', and a spin torque oscillator (STO) 10' having a multi-layer structure of magnetic films and provided in a write gap between the main magnetic pole 6' and the trailing shield 81' (for example, U.S. Pat. No. 9,047,887). The spin torque oscillator 10' is an element that receives spin transfer torque and whose magnetization fluctuates while processing, and by the magnetic field generated from the spin torque oscillator 10' exerting an interaction on the recording magnetic field (strengthening and weakening the recording magnetic field), it is possible to improve recording performance. For example, the spin torque oscillator 10' can generate a microwave magnetic field in the in-plane direction through its oscillation. By the microwave magnetic field and the recording magnetic field being applied in a superimposed manner on the magnetic recording medium, precession movement of the magnetization of the recording layer is induced, and magnetization in the perpendicular direction in the recording layer is reversed.

In the magnetic recording head, it is necessary to increase the spin transfer torque acting on the spin torque oscillator 10' and to increase the amount of magnetization fluctuation to exert sufficient interaction on the recording magnetic field by the magnetic field emitted from the spin torque oscillator 10'. Consequently, it is desirable to keep the write gap as narrow as possible and to focus the applied current on the spin torque oscillator 10'. However, as shown in FIG. 12, a capacitance (parasitic capacitance) is created between the main magnetic pole 6' and the trailing shield 81', which face each other across the write gap. This creates the problem that it becomes difficult to focus the applied current on the spin torque oscillator 10'.

SUMMARY OF THE INVENTION

The objective of the present invention is to provide a new magnetic recording head, head gimbal assembly and magnetic recording device in which it is easier to focus the applied current on the spin torque oscillator.

In order to achieve the above objective, the present invention provides a magnetic recording head including a main magnetic pole that generates a recording magnetic field applied on a magnetic recording medium, from an end surface that forms a part of an air bearing surface facing the magnetic recording medium; a trailing shield that is placed by interposing a write gap at a trailing side of the main magnetic pole; and a spin torque oscillator provided in the write gap between the main magnetic pole and the trailing shield. The spin torque oscillator generates a magnetic field that exerts an interaction on the recording magnetic field applied on the magnetic recording medium. When viewed from the air bearing surface side of the magnetic recording head, the length in the down-track direction between the trailing shield and the cross-track direction end portion of a first end face positioned at the main magnetic pole side of the spin torque oscillator is greater than the length in the down-track direction between the trailing shield and the main magnetic pole at a center position in the cross-track direction of the spin torque oscillator.

In the above-described magnetic recording head, it is possible to make the difference between the length in the down-track direction between the trailing shield and the cross-track direction end of the first end face positioned on the main magnetic pole side of the spin torque oscillator and the length in the down-track direction between the trailing shield and the main magnetic pole at the center position in the cross-track direction of the spin torque oscillator at least 5 nm and, more preferably, 5~10 nm.

In the above-described magnetic recording head, it is preferable for, in a cut plane surface orthogonal to the air bearing surface and parallel to the down-track direction, the length in the direction orthogonal to the first end face and between the first end face positioned on the main magnetic pole side of the spin torque oscillator at a predetermined position more rearward in the height direction from the air bearing surface and a second end face, which is positioned on the trailing shield side, to be smaller than the length in the direction orthogonal to the first end face and between the end of the first end face positioned rearward in the height direction from the air bearing surface and the trailing shield. When viewed from the air bearing surface side, it is possible for the width along the cross-track direction of the first end face of the spin torque oscillator to be larger than the width along the cross-track direction of a surface facing the spin torque oscillator in the trailing shield.

The above-described write gap includes a first write gap portion, positioned at approximately the center in the cross-track direction, in which the spin torque oscillator is provided and a second write gap portion and a third write gap portion, which are connected to the ends in the cross-track direction of the first write gap portion and respectively extend toward the two outer sides in the cross-track direction; and when viewed from the air bearing surface side, the respective lengths in the down-track direction of the second write gap portion and the third write-gap portion may be shorter than, or may be identical, to the length in the down-track direction between the trailing shield and the cross-track direction end of the first end face positioned at the main magnetic pole side of the spin torque oscillator.

The present invention provides a magnetic recording head including a main magnetic pole that generates a recording magnetic field applied on a magnetic recording medium, from an end surface that is one portion of an air bearing surface facing the magnetic recording medium; a trailing shield provided on the trailing side of the main magnetic pole, having a write gap; and a spin torque oscillator provided in the write gap between the main magnetic pole and the trailing shield. The spin torque oscillator generates a magnetic field that exerts an interaction on the recording magnetic field applied on the magnetic recording medium; wherein, in a cut plane surface orthogonal to the air bearing surface and parallel to the down-track direction, the length in the direction orthogonal to a first end face between the first end face positioned on the main magnetic pole side of the spin torque oscillator at a predetermined position more rearward in the height direction than the air bearing surface and a second end face positioned on the trailing shield side, is shorter than the length in the direction orthogonal to the first end face, between the end of the first end face positioned rearward in the height direction from the air bearing surface and the trailing shield.

The present invention provides a head gimbal assembly including the above-described magnetic recording head, and a suspension supporting the magnetic recording head.

The present invention provides a magnetic recording device including a magnetic recording medium, the magnetic recording head, and a position-determining device that supports the magnetic recording head and also determines position relative to the magnetic recording medium.

With the present invention, it is possible to provide a new magnetic recording head, head gimbal assembly and magnetic recording device that can make it easy to focus the applied current on the spin torque oscillator.

DETAILED DESCRIPTION OF THE INVENTION

Prior to the explanation of the embodiments of the present invention, the terms used in this specification are defined. In the laminated structure or element structure formed on the element formation surface of the slider substrate of the magnetic recording head according to this embodiment, as viewed from a reference layer or element, the substrate side is referred to as "downward" and the opposite side is referred to as "upward". Further, as viewed from a reference layer or element, the air bearing surface side is referred to as "forward" and the opposite side is referred to as "backward" or "rearward". Furthermore, in the magnetic recording head according to this embodiment, the X-, Y- and Z-axis directions are defined in a number of the drawings as needed. Here, the Z-axis direction is the above-mentioned "upward and downward direction", with the +Z side corresponding to the trailing side and the −Z side corresponding to the leading side. In addition, the Y-axis direction is the track width direction, and the X-axis direction is the height direction.

[Magnetic Recording Device]

Figure 1:
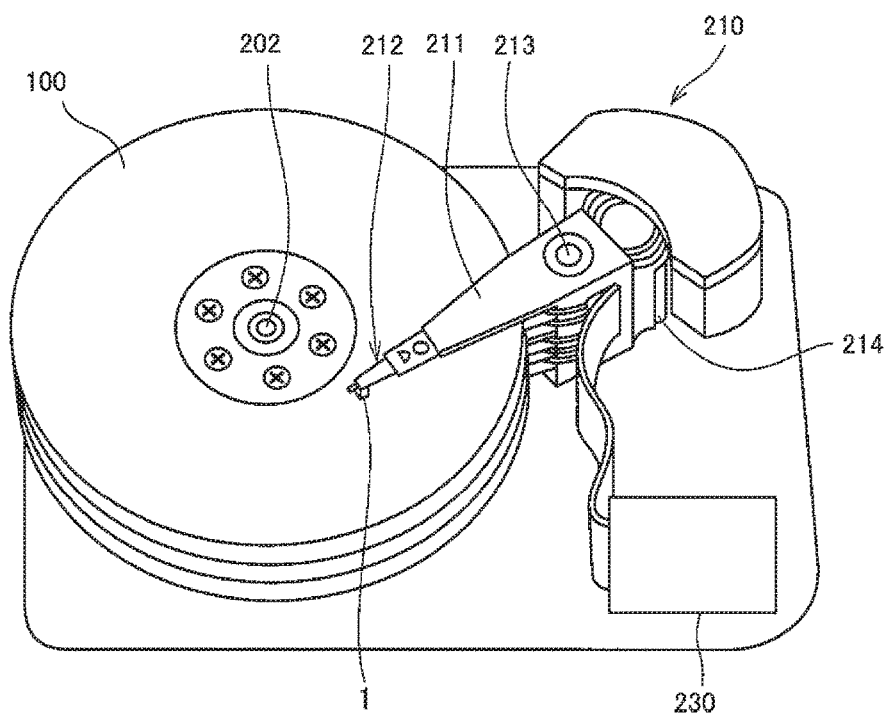
FIG. 1 is a perspective view schematically showing a magnetic recording device according to an embodiment of the present invention.
Figure 2:
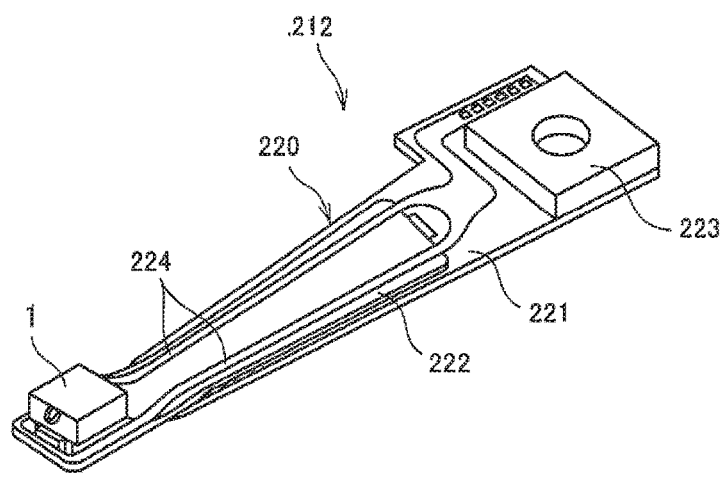
FIG. 2 is a perspective view schematically showing a head gimbal assembly (HGA) according to the embodiment of the present invention.
Figure 3:
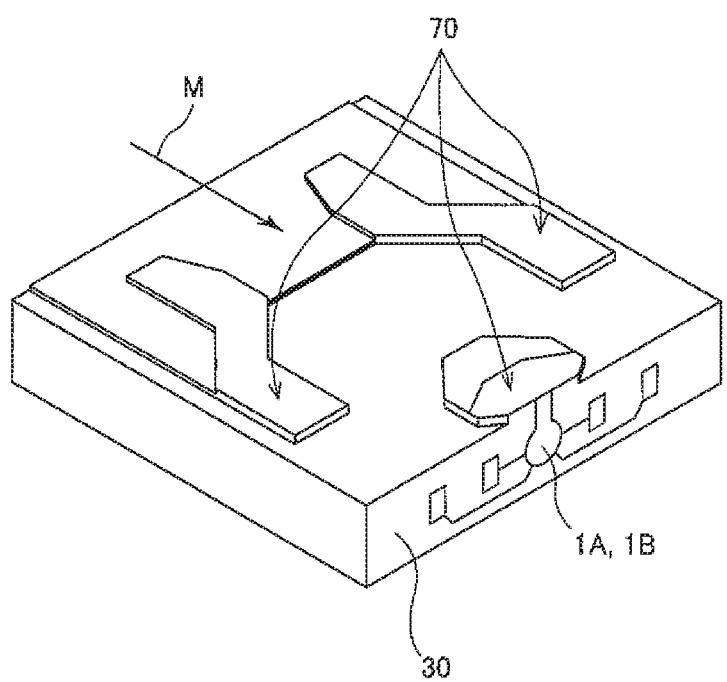
FIG. 3 is a perspective view schematically showing the entire structure of a magnetic recording head according to the embodiment of the present invention.

FIG. 1 is a perspective view schematically showing a magnetic recording device according to the present embodiment, FIG. 2 is a perspective view schematically showing a head gimbal assembly (HGA) according to the present embodiment, and FIG. 3 is an perspective view schematically showing the entire structure of a magnetic recording head according to the present embodiment.

As shown in FIG. 1, the magnetic recording device according to the present embodiment includes a plurality of magnetic disks 100 that rotate around a rotation axis of a spindle motor 202, an assembly carriage device 210 provided with a plurality of drive arms 211, a head gimbal assembly (HGA) 212 having a magnetic recording head 1 attached to the front end of the various drive arms 211, and a control circuit 230 that controls the writing and reading actions and so forth of the magnetic recording head 1.

In the present embodiment, the magnetic disk 100, which serves as a magnetic recording medium, is for perpendicular magnetic recording. For example, a soft magnetic backing layer, an intermediate layer, a magnetic recording layer (perpendicular magnetization layer) and the like are sequentially laminated on the disk substrate.

The assembly carriage device 210 is a device for positioning the magnetic recording head 1 on a track on which the recording bits of the magnetic disk 100 are arranged. In the assembly carriage device 210, the drive arms 211 are stacked in a direction along a pivot bearing shaft 213 and are configured to be capable of angular oscillation about the pivot bearing shaft 213 by a voice coil motor (VCM) 214.

The structure of the magnetic recording device according to the present embodiment is not restricted to the above described structure and may have a single magnetic disk 100, drive arm 211, HGA 212 and magnetic recording head 1.

In the head gimbal assembly 212 shown in FIG. 2, a suspension 220 includes a load beam 221, a flexure 222, which is fixed to the load beam 221 and which has elasticity, and a base plate 223, which is provided at the base portion of the load beam 221. Further, wiring members 224, including a lead conductor and connection pads electrically connected to the ends of the wiring members, is provided on the flexure 222. A magnetic recording head slider 30 (see FIG. 3), which is included in the magnetic recording head 1 in the present embodiment, is fixed to the flexure 222 at the end portion of the suspension 220 to face the surface of each magnetic disk 100 at a predetermined interval (flying height).

Furthermore, one end of the wiring members 224 is electrically connected to a terminal electrode of the magnetic recording head 1 in the present embodiment. The structure of the suspension 220 in the present embodiment is not restricted to the above-described structure.

As shown in FIG. 3, the magnetic recording head slider 30 has an ABS (air bearing surface) 70 directly involved in the flying characteristics and is provided with a magnetic recording head 1 at the side surface end (the side surface end on the downstream side in the moving direction M of the magnetic disk 100) in the moving direction M (the same direction as the air flow) side of the magnetic disk 100. The magnetic recording head 1 includes a recording head unit 1B and a reproducing head unit 1A.

[Magnetic Recording Head]

Next, the magnetic recording head according to the present embodiment is described with reference to the drawings.

Figure 4:
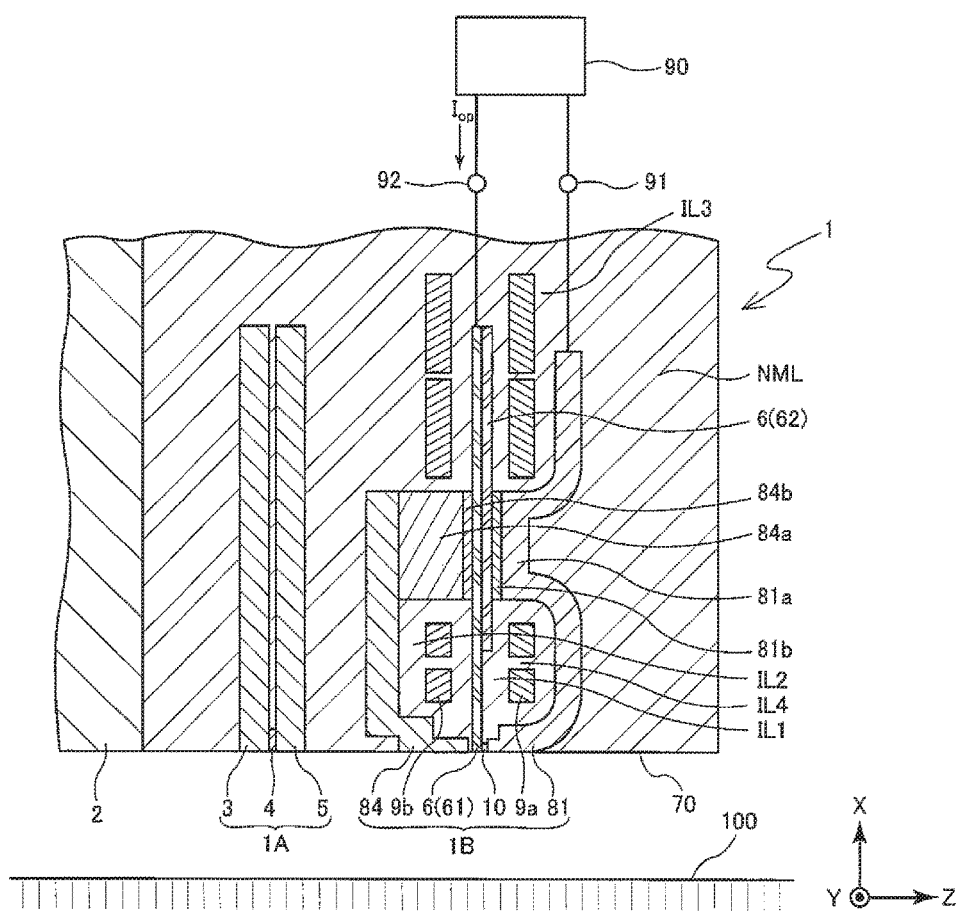
FIG. 4 is a cross-sectional view (XZ plane) schematically showing a configuration of core parts of the magnetic recording head according to the embodiment of the present invention.

FIG. 4 is a cross-sectional view (XZ cross-sectional view) along the direction intersecting the ABS, which is the air bearing surface of the magnetic recording head according to the present embodiment.

As shown in FIG. 4, the magnetic recording head 1 according to the present embodiment has a slider substrate 2, a reproducing head unit 1A, and a recording head unit 1B formed in layers on the element formation surface of the slider substrate 2. In addition, the magnetic recording head 1 includes the ABS 70, which is the air bearing surface facing the magnetic disk 100.

The reproducing head unit 1A includes an MR element 4 positioned near the ABS 70, for detecting a signal magnetic field from the magnetic disk 100, and a lower shield layer 3 and an upper shield layer 5, which are made of magnetic materials formed on the element formation surface of the slider substrate 2.

The lower shield layer 3 and the upper shield layer 5 are primarily provided to prevent the MR element 4 from receiving external magnetic fields, which will become noise. The lower shield layer 3 and the upper shield layer 5 are magnetic layers made of magnetic materials formed, for example, through a frame plating method, a sputtering method or the like. The lower shield layer 3 and the upper shield layer 5 are respectively made of NiFe (permalloy), FeSiAl (sendust), CoFeNi, CoFe, FeN, FeZrN or CoZrTaCr or the like, for example, or soft magnetic materials such as multi-layer films of these materials. The thicknesses of the lower shield layer 3 and the upper shield layer 5 are about 0.1~3 µm, for example.

The MR element 4 is a magnetic sensor that senses the signal magnetic fields using an MR effect, and, for example, may be any of a CIP-GMR (Current In Plane-Giant Magneto-Resistive) multilayer body that uses a current in-plane giant magneto-resistive effect, a CPP-GMR (Current Perpendicular to Plane-Giant Magneto-Resistive) multilayer body that uses a perpendicular current giant magneto-resistive effect, or a TMR (Tunneling Magneto-Resistive) multilayer body that uses a tunnel magneto-resistive effect.

The MR element 4 utilizing these MR effects can sense the signal magnetic fields from the magnetic disk 100 with high sensitivity. When the MR element 4 is a CPP-GMR multilayer body or a TMR multilayer body, the lower shield layer 3 and the upper shield layer 5 can also serve as an electrode. On the other hand, when the MR element 4 is a CIP-GMR multilayer body, insulating layers are respectively provided between the MR element 4 and the lower shield layer 3 and between the MR element 4 and the upper shield layer 5. Further, an MR lead layer electrically connected to the MR element 4 is provided.

The recording head unit 1B is for perpendicular magnetic recording and has a main magnetic pole layer 6, a trailing shield 81, a leading shield 84, a spin torque oscillator 10 positioned in the gap (write gap) between the main magnetic pole layer 6 and the trailing shield 81, a first coil 9a, and a second coil 9b.

The main magnetic pole layer 6 forms a magnetic path that focuses magnetic flux generated by applying a current on the first coil 9a and the second coil 9b and conducts this magnetic flux to the magnetic recording layer (perpendicular magnetization layer) of the magnetic disk being written on.

The main magnetic pole layer 6 extends from the ABS 70 to the rear in the height direction and includes a main magnetic pole section 61 and an auxiliary magnetic pole section 62. The main magnetic pole section 61 and the auxiliary magnetic pole section 62 can be positioned upside down (Z direction) depending on design specifications.

Figure 5:
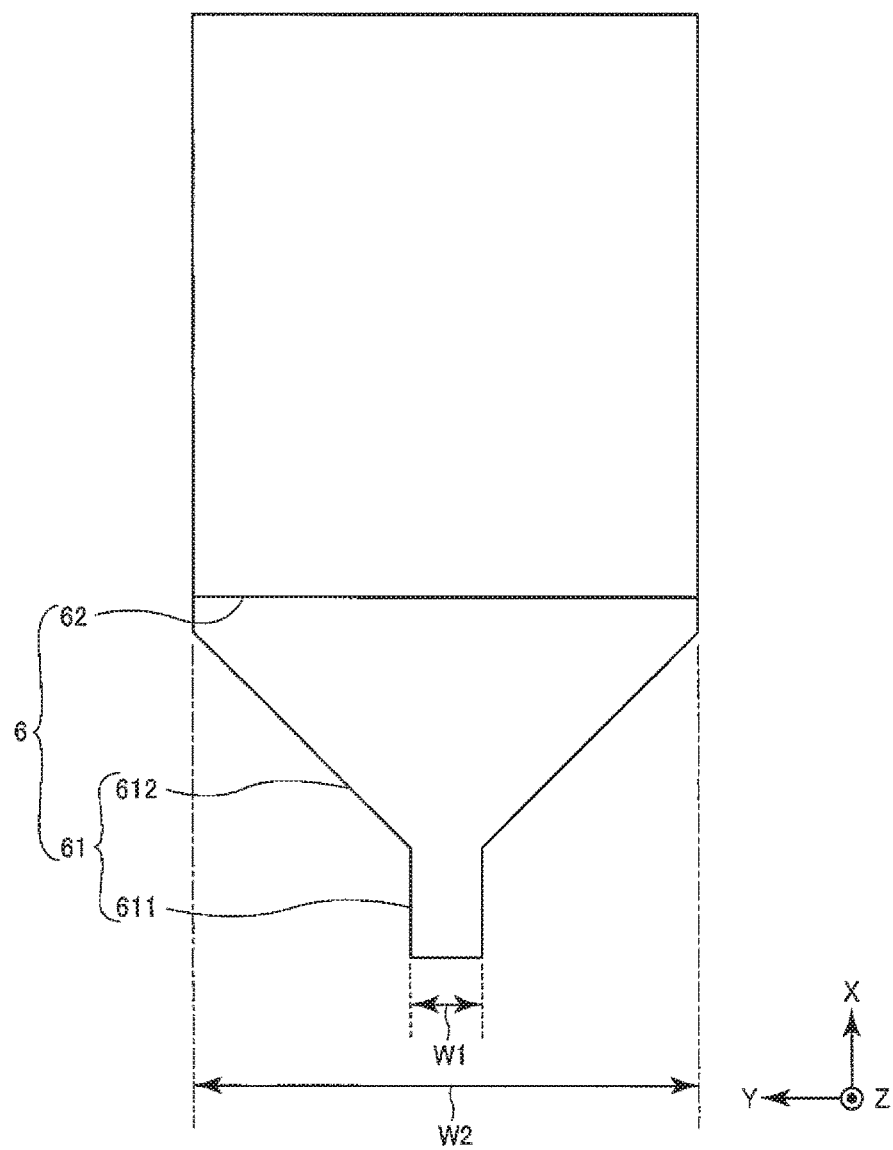
FIG. 5 is a plan view schematically showing a main magnetic pole layer in the recording head of the magnetic recording head according to the embodiment of the present invention.

The auxiliary magnetic pole section 62 extends in the height direction from a position more to the rear than the ABS 70. This auxiliary magnetic pole section 62 is positioned on the trailing side of the main magnetic pole section 61, for example, has a rectangular planar shape (width W2), as shown in FIG. 5. The auxiliary magnetic pole section 62, as described above, may also be positioned on the leading side of the main magnetic pole section 61.

The main magnetic pole section 61 extends from the ABS 70 toward to the rear in the height direction. This main magnetic pole section 61 for example, includes a narrow first magnetic pole section 611, which extends from the ABS 70 to the rear in the height direction, and a wide second magnetic pole section 612, which connects to the rear of the first magnetic pole section 611, as shown in FIG. 5.

The first magnetic pole section 611 is an effective magnetic flux emitting portion and has a fixed width W1 that regulates the recording track width. The second magnetic pole section 612 is a section supplying magnetic flux to the first magnetic pole section 611 and has a width W2 that is greater than the width W1 of the first magnetic pole section 611. The width W2 of the second magnetic pole section 612 gradually narrows toward the front in the height direction approaching the first magnetic pole section 611. By the first magnetic pole section 611 having a narrow width W1, it is possible to generate a fine writing magnetic field, and it is possible to set the track width to a minute value compatible with high recording density.

Figure 7A:
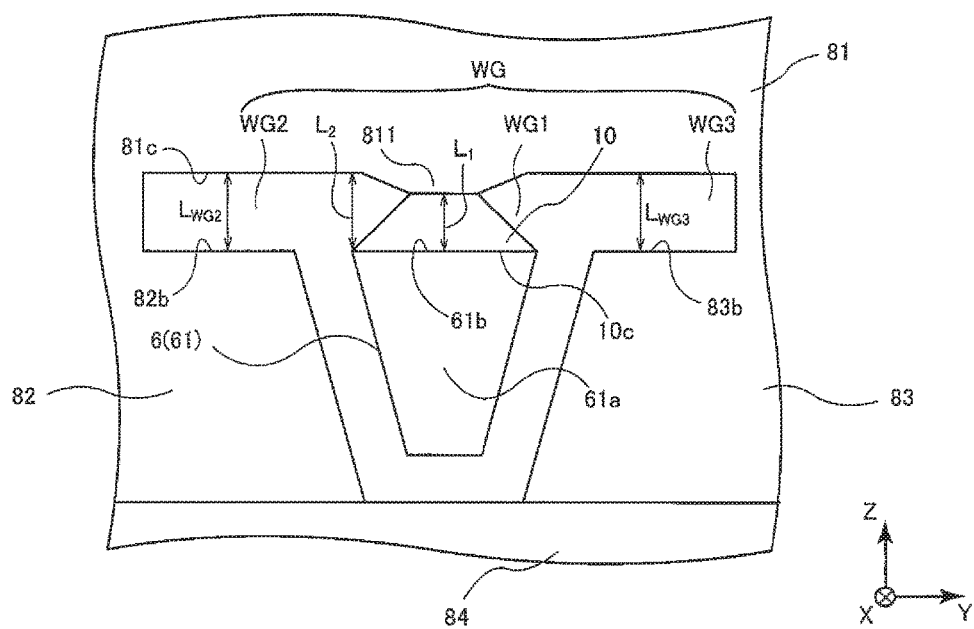
FIG. 7A is a plan view from the ABS side, showing a schematic configuration of a first state of the recording head of the magnetic recording head according to the embodiment of the present invention.
Figure 7B:
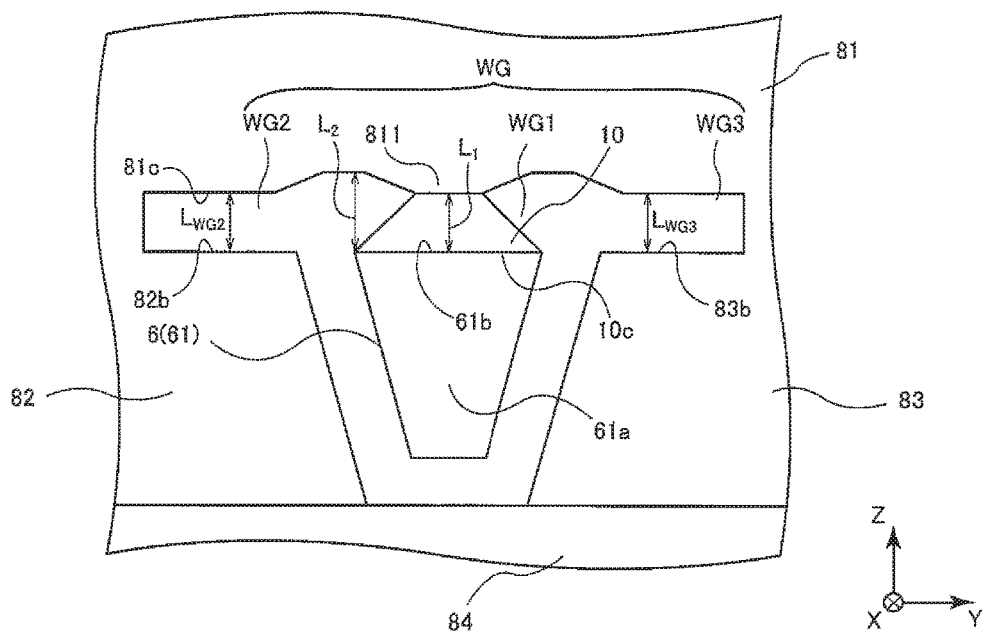
FIG. 7B is a plan view from the ABS side showing a schematic configuration of a second state of the recording head of the magnetic recording head according to the embodiment of the present invention.

The main magnetic pole section 61 has a so-called inverted trapezoid-shaped end face 61a in which, at the ABS 70, the top side (+Z side) is wider than the lower side (-Z side), and the width thereof narrows when moving in the downward direction (-Z direction), for example (see FIGS. 7A-7B).

The main magnetic pole layer 6 (main magnetic pole section 61 and auxiliary magnetic pole section 62) is made of a soft magnetic material having a high saturation magnetic flux density, for example, can be made of a soft magnetic material that is a ferroalloy material (FeNi, FeCo, FeCoNi, FeN, FeZrN, or the like) having Fe as a major component. The main magnetic pole section 61 and the auxiliary magnetic pole section 62 may also be independent and each composed of a different soft magnetic material. For example, the main magnetic pole section 61 may be composed of a soft magnetic material having a higher saturation magnetic flux density than the auxiliary magnetic pole section 62.

Figure 6:
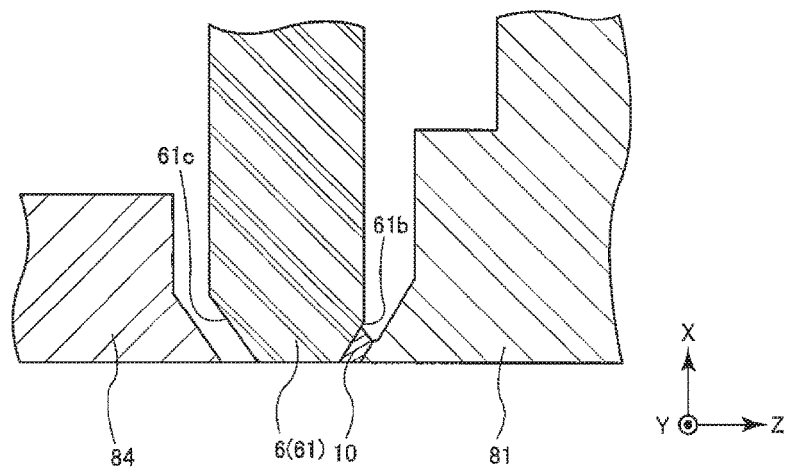
FIG. 6 is a partial enlarged cross-sectional view showing a schematic configuration of the recording head of the magnetic recording head according to the embodiment of the present invention.

As shown in FIG. 6, the trailing side (+Z side) end face 61b and the leading side (-Z side) end face 61c of the main magnetic pole section 61 positioned near the ABS 70 are composed in a tapered shape so that the thickness (thickness in the Z direction) of the main magnetic pole section 61 gradually decreases toward the ABS 70. Through this, the recording magnetic flux emitted from the main magnetic pole section 61 (first magnetic pole section 611) can be more focused at the ABS 70.

As shown in FIGS. 7A~7B, the main magnetic pole section 61, when viewed from the ABS 70 side, is surrounded by the trailing shield 81, the side shields 82 and 83, which connect to the trailing shield 81 at both outer sides in the cross-track direction, and the leading shield 84, which connects to the side shields 82 and 83. The trailing shield 81 is positioned on the trailing side of the main magnetic pole section 61 so that the write gap WG is between the trailing shield 81 and the main magnetic pole section 61. The trailing shield 81, the side shields 82 and 83 and the leading shield 84 have the function of taking in the recording magnetic flux emitted and spreading from the main magnetic pole section 61. The trailing shield 81 reaches the ABS 70 and serves the role of a magnetic path for the magnetic flux that has returned from the soft magnetic backing layer provided under the recording layer (perpendicular magnetization layer) of the magnetic disk 100. The trailing shield 81, the side shields 82 and 83 and the leading shield 84, for example, have a high saturation magnetic flux density and are made of NiFe (permalloy) or a ferroalloy material or the like, similar to the main magnetic pole layer 6.

The write gap WG has a shape effectively extending linearly along the cross-track direction between the main magnetic pole section 61 and the trailing shield 81 and is a gap that extends on the trailing side (+Z side) end face 61b of the main magnetic pole section 61 and the trailing side (+Z side) end faces 82b and 83b of the side shields 82 and 83 and the leading side (-Z side) end face 81c of the trailing shield 81. The write gap WG includes a first write gap portion WG1, which is positioned approximately in the center in the cross-track direction, facing the trailing side (+Z) end face 61b of the main magnetic pole section 61, and a second write gap portion WG2 and a third write gap portion WG3, respectively connecting to the ends of the first write gap portion WG1 in the cross-track direction and extending to the outside in the cross-track direction. The second write gap portion WG2 and the third write gap portion WG3 are positioned between (between in the down-track direction) the end face 81c of the trailing shield 81 and the end faces 82b and 83b of the side shields 82 and 83, respectively. The write gap WG is connected to the ends of the first write gap portion WG1 in the cross-track direction and includes the second write gap portion WG2 and the third write gap portion WG3 extending to the outside in the cross-track direction. Through this, it is possible to improve the magnetic field strength Hy in the down-track direction and the recording magnetic field gradient HGy. As a result, improving the recording magnetic field gradient HGy makes it possible to improve the bit density (BPI).

The length (length between the main magnetic pole section 61 and the trailing shield 81) $L_1$ in the down-track direction of the first write gap portion WG1 at the central position in the cross-track direction of the spin torque oscillator 10 provided in the first write gap portion WG1 is shorter than the length $L_2$ in the down-track direction of the first write gap portion WG1 at the end portion in the cross-track direction of the end face 10c positioned at the main magnetic pole section 61 side (leading side (-Z side)) of the spin torque oscillator 10. Through this, it is possible to reduce the capacitance (parasitic capacitance) component generated between the main magnetic pole section 61 and the trailing shield 81, and focusing the drive current Iop on the spin torque oscillator 10 is possible. As a result, the magnetization amplitude of the spin torque oscillator 10 can be increased.

The length $L_1$ in the down-track direction of the first write gap portion WG1 at the center position in the cross-track direction of the spin torque oscillator 10 is set appropriately in accordance with the laminate thickness of the spin torque oscillator 10, but the length $L_2$ in the down-track direction of the first gap portion WG1 at an end portion in the cross-track direction of the end face 10c positioned on the main magnetic pole section 61 side of the spin torque oscillator 10 is appropriately set so that it is possible to make the parasitic capacitance component sufficiently small by separating the main magnetic pole section 61 and the trailing shield 81.

The difference between the length $L_2$ in the down-track direction of the first write gap portion WG1 at an end portion in the cross-track direction of the end face 10c positioned on the main magnetic pole section 61 side of the spin torque oscillator 10 and the length $L_1$ in the down-track direction of the first write gap portion WG1 at the center position in the cross-track direction of the spin torque oscillator 10 may be 5 nm or more, for example, and is preferably 5~10 nm. When the difference between the lengths $L_2$ and $L_1$ is less than 5 nm, there are concerns that it will not be able to effectively reduce the parasitic capacitance component that arises between the main magnetic pole section 61 and the trailing shield 81. Further, when the difference between the lengths $L_2$ and $L_1$ exceeds 10 nm, the main magnetic pole section 61 and the trailing shield 81 are separated and the recording magnetic field gradient becomes small, raising concerns that recording performance will be impaired.

In order to have this configuration, in the present embodiment when viewed from the ABS 70 the trailing shield 81 is composed to have a protrusion 811 such that the surface facing the spin torque oscillator 10 protrudes toward the spin torque oscillator 10 (leading side, −Z side). Through this, the protrusion 811 of the trailing shield 81 readily has a single domain structure through shape anisotropy, and the magnetization of the protrusion 811 is magnetostatically coupled to the spin torque oscillator 10 and is stable. In addition, the magnetic flux is focused on the protrusion 811, so that it is possible to improve the rising time of the oscillations of the spin torque oscillator 10. The shape of the protrusion 811 of the trailing shield 81 (the shape as viewed from the ABS 70 side) is an approximately trapezoidal shape such as that shown in FIGS. 7A~7B, but the shape may be an approximately semispherical shape, an approximately square shape or the like.

In the present embodiment, the length $L_2$ in the down-track direction of the first write gap portion WG1 at an end portion in the cross-track direction of the end face 10c positioned on the main magnetic pole section 61 side of the spin torque oscillator 10 and the lengths $L_{WG2}$ and $L_{GW3}$ in the down-track direction of the second write gap portion WG2 and the third write gap portion WG3 may be identical to each other, as shown in FIG. 7A. The length $L_2$ in the down-track direction of the first write gap portion WG1 at an end portion in the cross-track direction of the end face 10c positioned on the main magnetic pole section 61 side of the spin torque oscillator 10 may be longer than the lengths $L_{WG2}$ and $L_{WG3}$ in the down-track direction of the second write gap portion WG2 and the third write gap portion WG3, as shown in FIG. 7B.

Figure 8:
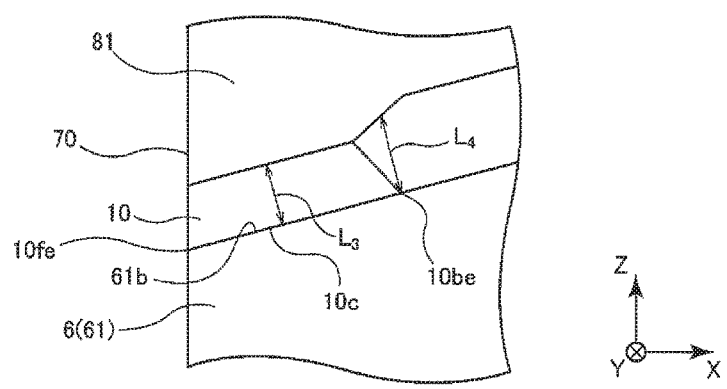
FIG. 8 is a partially enlarged cross-sectional view showing a schematic configuration of a main magnetic pole unit, a spin torque oscillator and a trailing shield of the magnetic recording head according to the embodiment of the present invention.

In the cross-sectional view of the magnetic recording head 1 according to the present embodiment, the length $L_3$ of the gap between the trailing shield 81 and the main magnetic pole section 61 at the center position in the height direction of the spin torque oscillator 10 is preferably shorter than the length $L_4$ of the gap between the trailing shield 81 and the main magnetic pole section 61 at the end 10be on the back side in the height direction of the end face 10c on the main magnetic pole section 61 side of the spin torque oscillator 10 (see FIG. 8). Since the gap length $L_3$ is shorter than the gap length $L_4$, it is possible to reduce the parasitic capacitance component generated between the main magnetic pole section 61 and the trailing shield 81 even at the rear side in the height direction, and the drive current Iop can be more efficiently focused on the spin torque oscillator 10. The center position in the height direction of the spin torque oscillator 10 is taken to be the center position on the line segment connecting the end 10be at the rear side in the height direction and the end 10fe on the ABS 70 side of the end face 10c on the main magnetic pole section 61 side of the spin torque oscillator 10 in the cross-sectional view of the magnetic recording head 1 (the end face 10c on the main magnetic pole section 61 side out of the end faces of the spin torque oscillator 10), and the gap lengths $L_3$ and $L_1$ are taken to be the lengths along a direction orthogonal to the end face 10c on the main magnetic pole section 61 side of the spin torque oscillator 10.

The spin torque oscillator 10 that generates the magnetic field (for example, a microwave magnetic field) that exerts an interaction on the recording magnetic field from the main magnetic pole layer 6 (main magnetic pole section 61) at the time of writing is provided in the write gap WG (first write gap portion WG1) between the main magnetic pole section 61 and the trailing shield 81. Details of the configuration of the spin torque oscillator 10 are described below.

In the rearward height direction from the ABS 70, a first back gap layer 81b, which is composed of an insulator, is positioned between the main magnetic pole layer 6 and the trailing shield 81 and electrically insulates such, and a second back gap layer 84b, which is composed of an insulator, is positioned between the main magnetic pole layer 6 and the leading shield 84 and electrically insulates such.

The first coil 9a and the second coil 9b generate magnetic flux for magnetic recording on the magnetic disk 100 and, for example, are made of a highly conductive material such as copper (Cu) or the like. The first coil 9a and the second coil 9b each have a winding structure (spiral structure) centered on connecting sections 81a and 84a, the first back gap layer 81b and the second back gap 84b, respectively. The first coil 9a and the second coil 9b each have a two-turn loop shape connecting from one end to the other end, and each has a front turn section approximately on top of insulating layers IL1 and IL2, respectively. The magnetic recording head 1 according to the present embodiment may be provided with a coil having a helical structure, instead of the first coil 9a and the second coil 9b having a spiral structure.

A nonmagnetic layer NML is provided via an insulating layer IL3 in a region to the rearward in the height direction from the front turn section of the first coil 9a and the second coil 9b. This nonmagnetic layer NML is continuously provided on top of the trailing shield 81 and reaches to the BS 70. The nonmagnetic layer NML primarily serves the function of a protective layer.

In the present embodiment, the number of turns of the first coil 9a and the second coil 9b is 2 turns, but this is intended to be illustrative and not limiting, for this may be appropriately set within the range of 1~4 turns.

The first coil 9a and the second coil 9b have a plurality of turns, and an insulating layer IL4 of dry film is preferably embedded in the wound coil gaps. The dry film insulating layer IL4 is preferably composed of a material such as alumina or the like deposited with the so-called CVD (Chemical Vapor Deposition) method. To fill and form the dry film insulating layer IL4 with certainty in the coil gap, the shape of the coil is particularly important, and it is particularly preferable that the coil does not have an inverted taper shape in the depth direction.

In the present embodiment, the main magnetic pole layer 6 (main magnetic pole section 61) and the trailing shield 81 are respectively connected via terminals 91 and 92 to a drive current circuit (power source circuit) 90 to apply the drive current Iop on the spin torque oscillator 10. The drive current Iop supplied from the drive current circuit 90 flows in the order of the main magnetic pole layer 6 (main magnetic pole section 61), the spin torque oscillator 10 and the trailing shield 81.

By having the drive current lop flow, electrons are spin polarized by the magnetization of a spin injection layer 14. When the spin polarization ratio of the spin injection layer 14 is positive, spin electrons polarized in the opposite direction to the majority spin of the spin injection layer 14 are reflected by the spin injection layer 14 and are injected into the magnetic field generation layer 12. These reflected spin electrons act to counteract damping of the magnetization of the magnetic field generation layer 12 caused by external magnetic fields, so that precession of the magnetization of the magnetic field generation layer 12 is stimulated and a magnetic field (for example, a microwave magnetic field) is generated from the magnetic field generation layer 12. This magnetic field exerts an interaction on the recording magnetic field from the main magnetic pole layer 6, making it possible to record signals on the magnetic disk 100 having large magnetic anisotropic energy Ku.

Depending on the layer composition of the spin torque oscillator 10, the generation mechanism of the microwave magnetic field and the like, the drive current $I_{OP}$ may flow in order of the trailing shield 81, the spin torque oscillator 10 and the main magnetic pole layer 6 (main magnetic pole section 61).

Details of the configuration of the spin torque oscillator 10 will now be described with reference to FIG. 9.

Figure 9:
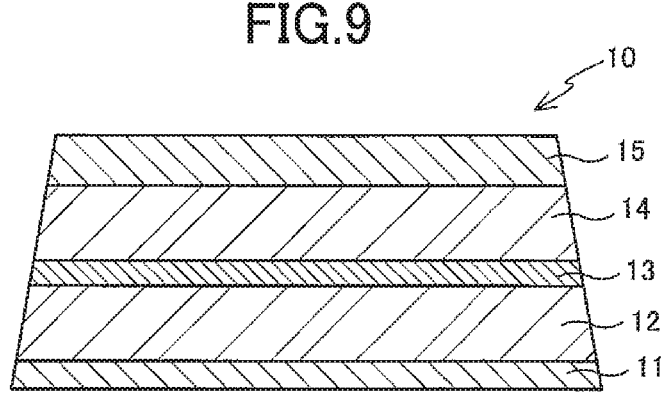
FIG. 9 is a cross-sectional view schematically showing a first state of a laminated structure of the spin torque oscillator in the embodiment of the present invention.

As shown in FIG. 9, the spin torque oscillator 10 is a laminated element with the following layer from the main magnetic pole layer 6 (main magnetic pole section 61) in the order of: a buffer layer 11, a magnetic field generation layer 12, a nonmagnetic spacer layer 13, the spin injection layer 14, and a cap layer 15, which is made of Ru or the like and is around 0.5~20 mm thick. The spin torque oscillator 10 passes a direct current from the buffer layer 11 side toward the cap layer side 15. Through this, the magnetization of the magnetic field generation layer 12 precesses and a magnetic field (for example, a microwave magnetic field) can be generated from the magnetic field generation layer 12. In the present embodiment, the layer composition of the spin torque oscillator 10 is not particularly limited as long as the spin transfer torque is received and the magnetization of the magnetic field generation layer 12 is fluctuated while precessing. The spin torque oscillator 10 may have at least a magnetic field generation layer 12 and a nonmagnetic layer (nonmagnetic spacer layer 13), for example, it may not have the buffer layer 11, the spin injection layer 14 and the cap layer 15. When the spin torque oscillator 10 does not have a spin injection layer 14, the main magnetic pole layer 6 (main magnetic pole section 61) contacting the nonmagnetic layer (nonmagnetic spacer layer 13) or the trailing shield 81 serves the function of the spin injection layer 14.

The buffer layer 11 is a metal simple layer composed of one metal selected from the group consisting of tantalum (Ta), aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), hafnium (Hf), tungsten (W), iridium (Ir), platinum (Pt) and gold (Au), or an alloy layer including at least one selected from the above group. The film thickness of the buffer layer 11 is preferably 0.4~5 nm, and more preferably 0.8~3 nm.

The magnetic field generation layer 12 is a ferromagnetic layer composed of a material in which the orientation of magnetization in the initial state (a state without electric current flowing and without a magnetic field being applied) is approximately parallel to the film surface. Since the strength of the magnetic field generated upon receiving the spin transfer torque (for example, the microwave magnetic field) increases as the film thickness and the saturation magnetization Ms of the magnetic field generation layer 12 increase, the magnetic field generation layer 12 is preferably composed of a material with a large saturation magnetization Ms, and the film thickness thereof preferably becomes thicker in a predetermined range that fits in the first write gap portion WG1 (see FIGS. 7A-7B). As the constituent material of the magnetic field generation layer 12, soft magnetic materials such as [FeCo/Ni]m, FeCo, FeCoAl, FeCoSi, FeCoB, FeNi or the like, or CoIr, [Fe/Co]m or the like having a negative perpendicular magnetic anisotropy can be cited. Here, "m" is a layer number repeating the laminated structure indicated in the brackets. When [FeCo/Ni]m is used as the constituent material of the magnetic field generation layer 12, the film thickness of FeCo is preferably thicker than the film thickness of Ni, the film thickness of FeCo is preferably 0.4~4 nm, and more preferably 0.8~2 nm, and the film thickness of Ni is preferably 0.1~1 nm and more preferably 0.1~5 nm. The repeated layer number m of the layer structure is preferably 1~20, and more preferably 3~10. The film thickness of the magnetic field generation layer 12 is preferably around 2~20 nm, and more preferably around 5~15 nm.

The nonmagnetic spacer layer 13 may be composed of a nonmagnetic metal with a high spin permeation ratio, such as copper (Cu), silver (Ag), gold (Au), chromium (Cr), aluminum (Al) or the like, and may be a tunnel barrier layer such as a MgO layer, an $Al_2O_3$ layer or the like. The film thickness of the nonmagnetic spacer layer 13 is, for example set to around 0.5~5 nm, and is preferably set to 1.5~3 nm. The exchange coupling status of the magnetic field generation layer 12 and the spin injection layer 14 can be optimally adjusted with the film thickness of the nonmagnetic spacer layer 13 within the above-described range.

Figure 10:
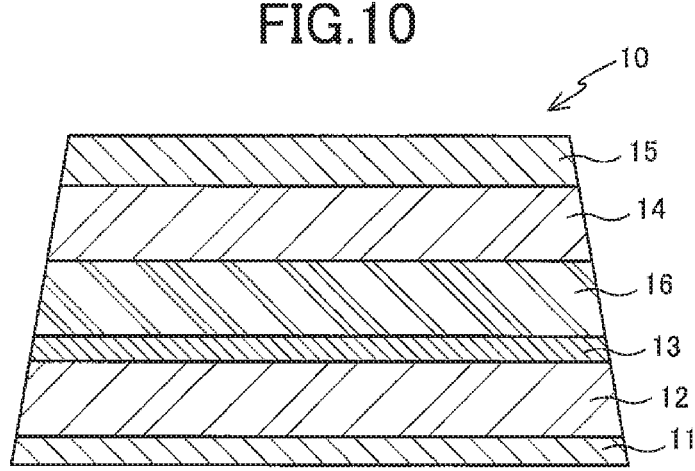
FIG. 10 is a cross-sectional view schematically showing a second state of a laminated structure of the spin torque oscillator in the embodiment of the present invention.

The spin injection layer 14 is a strongly magnetic layer having a magnetic anisotropy in a perpendicular direction with respect to the film surface (perpendicular magnetic anisotropy), and is composed of a multi-layer film of magnetic bodies such as $[CoFe/Ni]n$, $[Co/Pt]_n$, $[Co/Pd]_n$ or the like, or a multilayer film of magnetic bodies and nonmagnetic bodies. Here, "n" is the number of repeated layers in the laminated structure indicated within the brackets. Moreover, as the material composing the spin injection layer 14, it is possible to use an alloy having perpendicular magnetic anisotropy, such as CoPt, FePt, MnGa or the like. When the spin injection layer 14 is composed of $[CoFe/Ni]_n$, the Ni film thickness is preferably the same as or thicker than the film thickness of CoFe. The film thickness of CoFe is preferably 0.1~1 nm and, more preferably, 0.1~0.4 nm. The film thickness of Ni is preferably 0.2~1.5 nm and, more preferably, 0.2~0.6 nm. The repeated layer number n of the laminated structure is preferably 2~40 and, more preferably. 2~20. The spin injection layer 14 is a layer that serves the role of causing spin polarization of electrons and injection of the electrons into the magnetic field generation layer 12, by electric current to flow in the layering direction of the spin torque oscillator 10. The film thickness of the spin injection layer 14 is preferably 0.6~15 nm and, more preferably, 1~10 nm. To increase the spin polarization ratio by the spin injection layer 14, a magnetic body layer with high spin polarization ratio may exist between the spin injection layer 14 and the nonmagnetic spacer layer 13. In particular, when the spin injection layer 14 is composed of $[CoFe/Ni]_n$, because Ni, which has a small spin polarization ratio, is used, the magnetic body layer 16 may be interposed between the nonmagnetic spacer layer 13 and the spin injection layer 14, as shown in FIG. 10. When the perpendicular magnetization anisotropy of the magnetic body layer 16 is smaller than the perpendicular magnetization anisotropy of the spin injection layer 14, the magnetization of the magnetic body layer 16 easily reverses. Through that, the magnetization reversal of the spin injection layer 14 is accelerated. As materials composing this magnetic body layer 16, it is possible to use soft magnetic alloys such as CoFe, CoFeB or the like, Co-based Heusler alloys such as $Co_2MnSi$, $Co_2FeSi$ or the like, and materials having a negative spin polarity such as FeCr, FeV or the like. The film thickness of the above-described magnetic body layer 16 is preferably 0.1~8 nm, and more preferably 0.4~4 nm.

Figure 11:
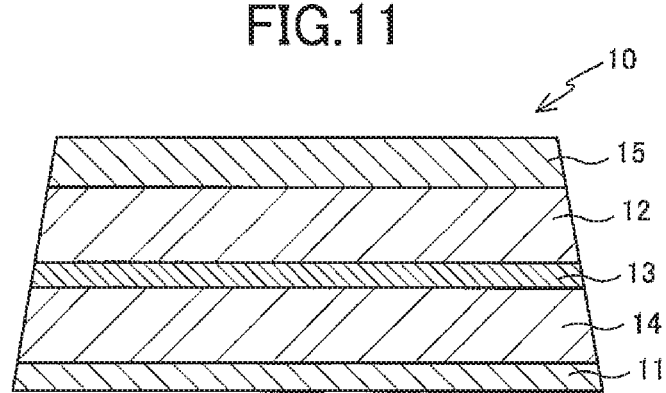
FIG. 11 is a cross-sectional view schematically showing a third state of a laminated structure of the spin torque oscillator in the embodiment of the present invention.
Figure 12:
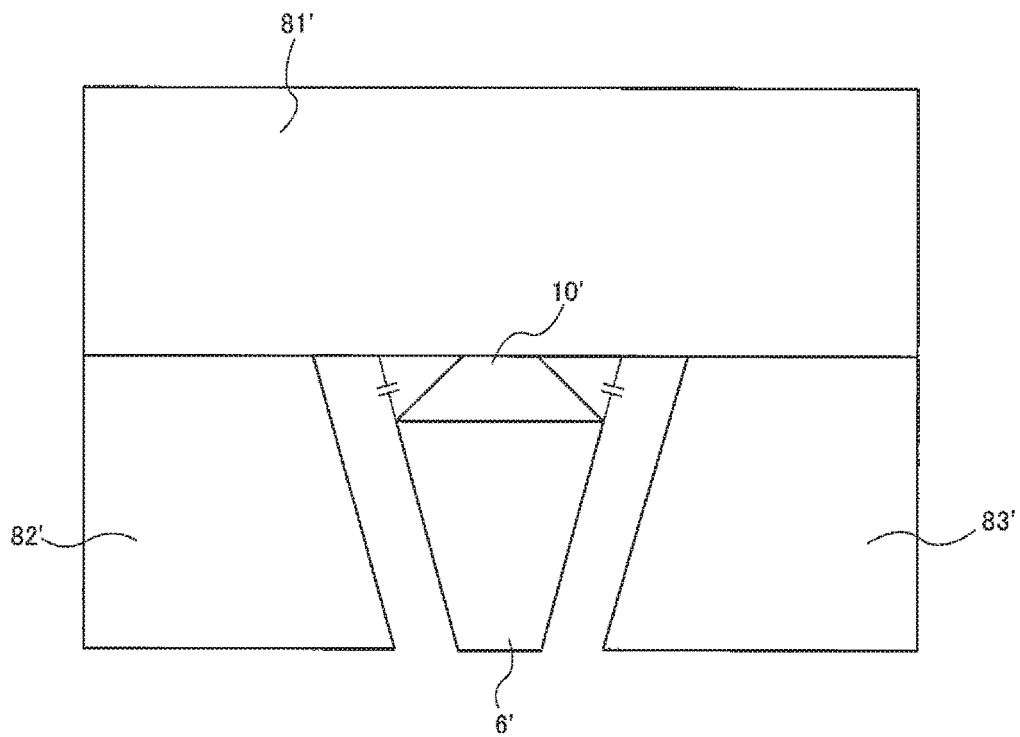
FIG. 12 is a plan view from the ABS side, showing a schematic configuration of the recording head of a conventional magnetic recording head.

As shown in FIG. 11, the spin torque oscillator 10 may be a laminated element in which the buffer layer 11, the spin injection layer 14, the nonmagnetic spacer layer 13, the magnetic field generation layer 12 and the cap layer 15 are laminated in this order from the main magnetic pole layer 6 (main magnetic pole section 61) side. When the spin torque oscillator 10 does not have the buffer layer 11, the spin injection layer 14 and the cap layer 15, and has the nonmagnetic layer (nonmagnetic spacer layer 13) and the magnetic field generation layer 12, the nonmagnetic layer (nonmagnetic spacer layer 13) may be positioned on the main magnetic pole layer 6 (main magnetic pole section 61) side, and the magnetic field generation layer 12 may be positioned on the main magnetic pole layer 6 (main magnetic pole section 61) side.

In the above-described magnetic recording head 1, it is possible to reduce the capacitance (parasitic capacitance) component generated between the main magnetic pole layer 6 (main magnetic pole section 61) and the trailing shield 81, by having the length $L_2$ in the down-track direction of the first write gap portion WG1 at the end portion in the cross-track direction of the spin torque oscillator 10 be longer than the length $L_1$ in the down-track direction of the first write gap portion WG1 at the center position in the cross-track direction of the spin torque oscillator 10 provided in the first write gap portion WG1 (the length between the main magnetic pole section 61 and the trailing shield 81). Through this, it is possible to focus the drive current $I_{OP}$ the spin torque oscillator 10, and it is possible to increase the magnetization amplitude of the spin torque oscillator 10.

Moreover, in the magnetic recording head 1 according to the present embodiment, in order to make the length $L_2$ longer than the length $L_1$, the trailing shield 81 is formed such that the surface facing the spin torque oscillator 10 has the protrusion 811 protruding toward the spin torque oscillator 10. Through this, the protrusion 811 of the trailing shield 81 readily has a single magnetic domain structure through shape anisotropy, and the magnetization of the protrusion 811 is magnetostatically coupled to the spin torque oscillator 10 and is stable, so that it is possible to improve the rising time of the oscillations of the spin torque oscillator 10.

Furthermore, since the write gap WG has the first write gap portion WG1 positioned between the main magnetic pole layer 6 (main magnetic pole section 61) and the trailing shield 81, and the second write gap portion WG2 and the third write gap portion WG3 respectively are connected to both ends thereof in the cross-track direction, it is possible to improve the magnetic field strength Hy in the down-track direction and the recording magnetic field gradient HGy. As a result, it is possible to improve the bit density (BPI).

Hence, with the magnetic recording head 1 according to the present embodiment, it is possible to record a signal with a high recording density on a magnetic recording medium having a large coercive force.

The above-described present embodiment was described in order to facilitate understanding of the present invention, and is not described to restrict the present invention. Accordingly, all elements disclosed in the above-described present embodiment should be construed to include all equivalents and design modifications within the technical scope of the present invention.

The invention claimed is:

1. A magnetic recording head, comprising:
   a main magnetic pole that generating a recording magnetic field applied on a magnetic recording medium, from an end surface that forms a part of air bearing surface facing the magnetic recording medium;
   a trailing shield that is placed by interposing a write gap at a trailing side of the main magnetic pole; and
   a spin torque oscillator provided in the write gap between the main magnetic pole and the trailing shield, wherein the spin torque oscillator generates a magnetic field that exerts an interaction on the recording magnetic field applied on the magnetic recording medium;
   wherein, when viewed from the air bearing surface side of the magnetic recording head, a length in the down-track direction between the trailing shield and the cross-track direction end portion of a first end face positioned at the main magnetic pole side of the spin torque oscillator is longer than a length in the down-track direction between the trailing shield and the main magnetic pole at a center position in the cross-track direction of the spin torque oscillator.

2. The magnetic recording head according to claim 1, wherein the difference between the length in the down-track direction between the trailing shield and the cross-track direction end portion of the first end face positioned on the main magnetic pole side of the spin torque oscillator and the length in the down-track direction between the trailing shield and the main magnetic pole at the center position in the cross-track direction of the spin torque oscillator is at least 5 nm.

3. The magnetic recording head according to claim 1, wherein the difference between the length in the down-track direction between the trailing shield and the cross-track direction end portion of the first end face positioned on the main magnetic pole side of the spin torque oscillator and the length in the down-track direction between the trailing shield and the main magnetic pole at the center position in the cross-track direction of the spin torque oscillator is 5~10 nm.

4. The magnetic recording head according to claim 1, wherein in a cut plane surface orthogonal to the air bearing surface and parallel to the down-track direction, a length in a direction orthogonal to the first end face, between the first end face positioned on the main magnetic pole side of the spin torque oscillator at a predetermined position more rearward in the height direction from the air bearing surfaces, and a second end face, positioned on the trailing shield side, is shorter than a length in the direction orthogonal to the first end face, between the end of the first end face positioned rearward in the height direction from the air bearing surface and the trailing shield.

5. The magnetic recording head according to claim 1, wherein when viewed from the air bearing surface side, a width along the cross-track direction of the first end face of the spin torque oscillator is larger than a width along the cross-track direction of a surface facing the spin torque oscillator in the trailing shield.

6. The magnetic recording head according to claim 1, wherein:
the write gap includes a first write gap portion, positioned at approximately the center in the cross-track direction, in which the spin torque oscillator is provided and a second write gap portion and a third write gap portion, which are connected to ends in the cross-track direction of the first write gap portion and respectively extend toward the two outer sides in the cross-track direction; and
when viewed from the air bearing surface side, the respective lengths in the down-track direction of the second write gap portion and the third write-gap portion are shorter than a length in the down-track direction between the trailing shield and the cross-track direction end portion of the first end face positioned at the main magnetic pole side of the spin torque oscillator.

7. The magnetic recording head according to claim 1, wherein:
the write gap includes a first write gap portion, positioned at approximately the center in the cross-track direction, in which the spin torque oscillator is provided and a second write gap portion and a third write gap portion, which are connected to ends in the cross-track direction of the first write gap portion and respectively extend toward the two outer sides in the cross-track direction; and
when viewed from the air bearing surface side, the respective lengths in the down-track direction of the second write gap portion and the third write gap portion are substantially the same as the length in the down-track direction between the trailing shield and the cross-track direction end of the first end face positioned at the main magnetic pole side of the spin torque oscillator.

8. A head gimbal assembly, comprising:
the magnetic recording head according to claim 1; and
a suspension supporting the magnetic recording head.

9. A magnetic recording device, comprising:
a magnetic recording medium;
the magnetic recording head according to claim 1; and
a position-determining device that supports the magnetic recording head and determines position relative to the magnetic recording medium.

* * * * *